Patented May 31, 1927.

1,630,661

UNITED STATES PATENT OFFICE.

ISAAC JARSON, OF CINCINNATI, OHIO.

PROCESS OF STERILIZING FOOD AND BEVERAGE PRODUCTS.

No Drawing.   Application filed September 15, 1925.   Serial No. 56,547.

This invention has for its object the destruction of the micro-organisms in milk, cream and other alimentary substances and beverages in such a manner as to be more economical of time, effort, supervision or control than any processes known to me, and to enable the substance treated to be received by the consumer in a sterilized condition but without having its taste, nutritive, and digestive qualities or its appearance impaired.

One object of this invention is to provide a means for sterilizing or processing which will destroy these bacteria without overcooking or scorching the milk or producing undesirable reactions on the cocoa or chocolate or other flavor which would be produced if heat were used as the sole sterilizing agent.

Another object is to produce this sterilizing effect with a minimum of heating, effort, supervision and control. My invention provides this sterilization without injurious reactions or production of bad tastes or damage to appearance, flavor or aroma. The full flavor of the milk is more especially maintained because by my process this ingredient receives the minimum of heating necessary to raise it to the proper temperature.

In carrying out my process, which can be illustrated by a milk cocoa-sugar syrup, the sugar syrup and the cocoa powder are heated together to the boiling point, but not boiled and then immediately added to ¼ volume of milk or milk powder solution which is at room temperature. The effect as has been noted in my experiments is that the temperature of the resulting mixture is between 160 and 180 degrees F. Then I stir in at once 1 gallon of 3% peroxide of hydrogen solution to 35 gallons of this resulting syrup above described, and without further thus heating, effort, supervision or control allow the reaction to proceed naturally during the gradual natural unaided cooling of the mixture. I have found that this effects perfect sterilization without production of deleterious reactions of any kind as regards taste, aroma, flavor or appearance and that more especially the true desired flavor of the milk is maintained unimpaired due to the minimum of heating which this ingredient suffers.

I have found that the proportion of ingredients and temperature mixture can be varied somewhat with equally good results. For example, I have found that one part of the boiling flavor-sugar syrup may be added to from 1/3 to 1/7 volume of milk or milk powder solution which is at room temperature. I have also found that the proportions of peroxide can be somewhat varied. For example, one volume of 3% peroxide may be added to from 25 to 45 gallons of milk-flavor syrup with approximately the same good results. However, I have found that in my hands the best results as regards economy, efforts and results is that outlined in my first example.

The main point of my invention is the method of producing the temperature of reaction of the peroxide-milk flavor mixture. In my invention this is obtained simply and with the minimum of heating, supervision, effort or control.

All previous methods known to me for obtaining the sterilization of products known as milk-flavor syrups involve much more heating, effort, supervision and control than my invention herein described.

Carbonated water may be added to quantities of the resultant product or syrup for providing a beverage. A small quantity of caustic soda or any suitable alkaline substance may be added to the syrup to check or neutralize any tendency of the syrup to ferment and thereby develop acid.

What I claim is:

1. The process of heating a flavoring syrup to approximately the boiling point, admixing same with milk at substantially room temperature and of such volume that the resultant product attains a temperature intermediate approximately 160 degrees F. and 180 degrees F., admixing with the resultant product a 3% peroxide of hydrogen solution, and permitting the then resultant mixture to cool without further artificial agitation thereof.

2. The process of heating a quantity of flavor-sugar syrup to approximately the boiling point thereof; introducing the flavor-sugar syrup into a quantity of milk of a volume from 1/3 to 1/7 the volume of the flavor-sugar syrup, said quantity of milk being substantially of room temperature, admixing therewith a quantity of 3% peroxide of hydrogen solution and permitting the resultant product to cool.

3. The process of heating a mixture of cocoa and sugar-syrup to the boiling point; introducing said composition into a quantity of milk having a volume of substantially ¼ the volume of said cocoa and sugar syrup composition, said milk being of substantially room temperature whereby the resultant mixture attains a temperature of approximately 160 degrees F. to 180 degrees F.; introducing a quantity of 3% peroxide of hydrogen solution in the proportion of approximately one part of the peroxide of hydrogen solution to thirty-five parts of the cocoa, sugar-syrup, milk product and permitting the resultant product to cool without artificial agitation thereof.

4. The process of heating a quantity of syrup, admixing the heated syrup with a quantity of milk such that the resultant temperature of the mixture is approximately 170 degrees F., admixing a quantity of hydrogen peroxide with the admixed syrup and milk and permitting the final mixture to cool forthwith.

In testimony whereof, I have hereunto subscribed my name this 14th day of September, 1925.

ISAAC JARSON.